United States Patent [19]
Hause

[11] 3,858,698
[45] Jan. 7, 1975

[54] UNITARY SPRING FOR STROKING TRANSMISSION SERVO MOTOR

[75] Inventor: Gilbert K. Hause, Bloomfield Hills, Mich.

[73] Assignee: General Motors Corporation, Detroit, Mich.

[22] Filed: May 16, 1973

[21] Appl. No.: 360,789

[52] U.S. Cl. ............... 192/89 R, 74/753, 188/72.3, 188/216, 192/70.28, 192/89 B, 192/109 A
[51] Int. Cl. .......................................... F16d 25/00
[58] Field of Search .......... 192/85 AA, 89 B, 99 A, 192/109 A, 70.28, 109 R, 89 R; 188/72.3, 216; 74/753

[56] References Cited
UNITED STATES PATENTS
2,725,964  12/1955  Maurer .............................. 192/89 B
3,237,739  3/1966  Pritchard .......................... 192/89 B

*Primary Examiner*—Samuel Scott
*Assistant Examiner*—John Reep
*Attorney, Agent, or Firm*—Charles R. White

[57] ABSTRACT

A continuous one-piece wire return spring having a serpentined frusto-conical shape is operatively disposed between each of the hydraulically operated servos and a multi-plate friction device in a transmission. Preferably each spring is made from annealed spring wire stock of circular cross section cut to length. Each part is hooped into a circle and the facing free end portions of the circled part are butt welded together. The circled part is waved into the general configuration of a frustum having a plurality of equally-spaced radia spring arms. The arms have central and inwardly curved contact segments forming the smaller end of the frustum and peripheral outwardly curved contact segments forming the base of the frustum.

3 Claims, 4 Drawing Figures

PATENTED JAN 7 1975 3,858,698

UNITARY SPRING FOR STROKING TRANSMISSION SERVO MOTOR

This invention relates to transmission control mechanisms and more particularly to a new and improved one-piece wire spring for transmission servo motors formed from spring steel wire stock of uniform cross section into a continuous waved frusto-conical spring member.

Many automatic transmissions employ a plurality of helical return springs for each of the hydraulically operated servos or apply pistons for the transmission clutches and brakes. Generally, these springs are mounted in special spring pockets or on posts formed on the piston and are operatively disposed between the piston and an annular spring retainer plate suitably secured in the transmission. While these prior constructions are highly reliable, their bulk adds to the weight of the transmission and consumes considerable radial and axial space. Additionally, the manufacture and assembly cost of these mutli-part constructions detracts from their employment in economy type vehicles.

Frusto-conical plate springs have also been employed in some prior transmission particularly where the spring is used as a lever arm to amplify the piston apply force. While such coned springs are compact they are costly to manufacture since they are stamped from steel stock and considerable offal is produced as a by-product. In some cases up to 60 percent of the total blank is scrap which is subject to recycling.

In this invention a new and improved piston spring provides for a more compact design and for maximum utilization of the spring stock material. In the preferred embodiment a single spring is made from spring wire stock of uniform cross section into a continuous serpentined frusto-conical spring to replace the multiple helical springs and the plate type cone springs of the prior art.

It is a feature, object and advantage of this invention to provide a new and improved continuous wire spring of uniform cross section for a transmission servomotor made from elongated spring steel stock into a serpentined frusto-conical configuration.

Another feature, object and advantage of this invention is to provide a new and improved continuous wire spring for transmission servomotors in which the spring is formed from spring wire stock of uniform cross section into a frusto-conical, serpentine spring which is made without producing any substantial scrap, which facilitates assembly of transmissions, which requires minimum space within a transmission and which reduces transmission weight.

Another object, feature and advantage of this invention is to provide a new and improved wire return spring for stroking a transmission servomotor in which the spring is formed from spring wire stock into a frusto-conical, serpentined spring that is uniform in cross section throughout and which provides a high spring force with small deflection that can be economically manufactured and installed in transmission assemblies.

These and other objects, advantages and features of the invention will become more apparent from the following detailed description and drawings in which.

Figure 1:
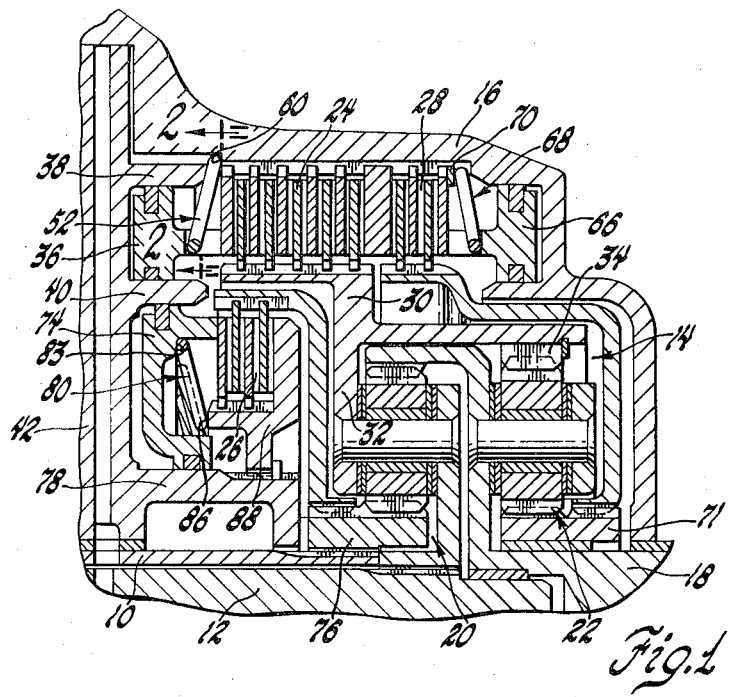
FIG. 1 is a cross-sectional side view of an upper portion of a transmission.

Turning now in more detail to the drawings, there is shown in FIG. 1 a transmission having a pair of selectively driven input shafts 10 and 12 drivingly connected to a change speed planetary gear unit 14 which is operatively mounted in a transmission case 16 for driving an output shaft 18. The planetary gear unit 14 comprises first and second planetary gearsets 20 and 22 which are operatively connected and which are controlled by multiple friction brakes 24, 26 and 28 to provide four forward drives, a reverse drive and neutral as described in my copending application Ser. No. 157,235 for Power Package, filed June 28, 1971 now U.S. Pat. No. 3,747,436.

Brake 24 has steel plates splined to the interior of case 16 which are interleaved with friction faced plates splined to the periphery of the drum 30. This drum is operatively connected to a planetary gear carrier 32 of the first planetary gearset driven by shaft 12 and to a ring gear 34 of the second planetary gearset 22. Brake 24 is selectively engaged by a hydraulically actuated piston 36 mounted in a bore formed between outer and intermediate annular shoulders 38 and 40 of a stationary bulkhead 42 fixed in the transmission case 16. Piston 36 has a circular arrangement of longitudinally extending contact fingers 44 that effect the frictional engagement of the brake 24 in response to the stroking of the piston 36 in its bore.

Figure 2:
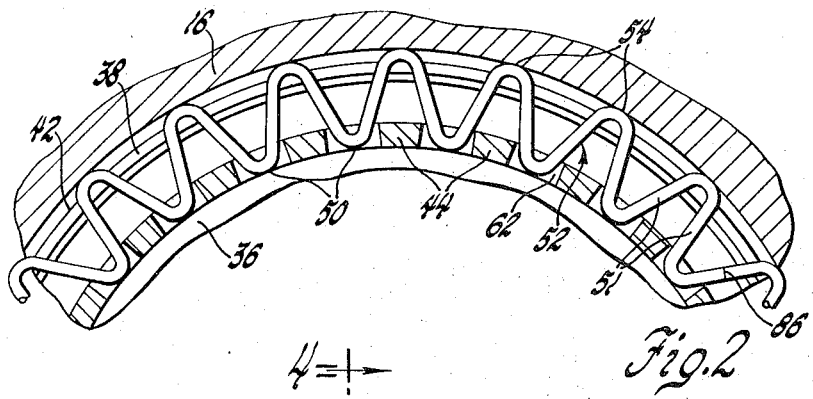
FIG. 2 is a view taken along lines 2—2 of FIG. 1.

As illustrated in FIG. 2, the contact fingers 44 are spaced to receive the central and inwardly curved segments 50 joining radiating arms 51 of a piston return spring 52. This return spring is a sinuous one-piece wire frustum with a base formed by the outwardly curved segments 54 and with an upper portion formed by the central segments 50. The base portion of this spring is anchored between a shoulder 60 of case 16 and the end of the outer shoulder 38 of the bulkhead 42 while the segments 50 bear against contact surfaces 62 formed between fingers 44.

When piston 36 strokes toward the brake pack 24 as apply pressure is fed to the pressure chamber behind piston 36, spring 52 deflects with decreasing cone angle while storing kinetic energy therein. When the apply pressure is exhausted from piston 36 the elastic spring recovers to its original shape to move the piston to its off position.

Brake 28 is selectively engaged for first and second forward drive by piston 66 which is the same in size and construction as piston 36. A one-piece return spring 68 is the same construction as spring 52, being made from spring wire into a serpentined and coned shape. As shown, this spring is operatively disposed between piston 66 and a snap ring 70 fitted internally into case 16. As with spring 52, the inwardly curved contact segments are disposed between the fingers of the piston 66. When piston 66 is stroked to frictionally engage the brake 28 to hold sun gear 71 of the planetary gearset 22 for reaction the gearset spring 68 is deflected to store kinetic energy for the return stroke when apply pressure is exhausted from the piston.

Figure 3:
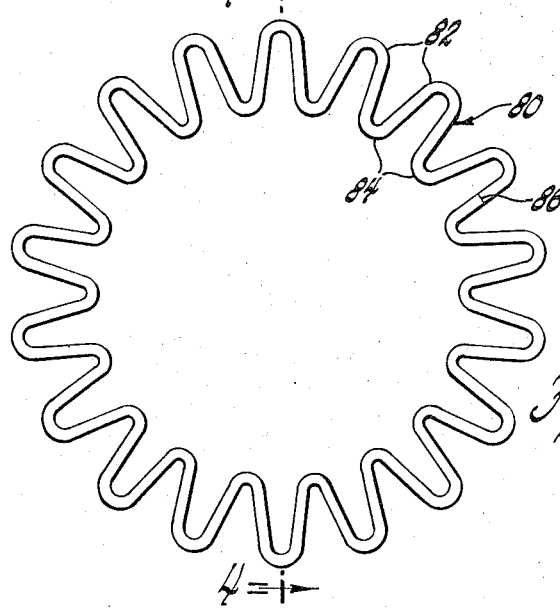
FIG. 3 is a plan view of one of the transmission return springs used in FIG. 1.
Figure 4:
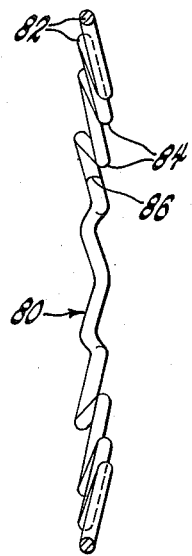
FIG. 4 is a view taken along the line 4—4 of FIG. 3.

The multiplate brake 26 disposed radially inwardly of brake 24 is selectively engaged by a piston 74 to hold sun gear 76 of the first planetary gearset 20 for reaction. As shown this piston is mounted in a bore formed between intermediate shoulder 40 and an inner shoulder 78 extending from bulkhead 42. A one-piece return spring 80, similar to the springs 52 and 68, best illustrated in FIGS. 3 and 4, is operatively mounted between the case and piston 74. This spring within the piston 74 and has outwardly curved segments 82 forming a base which is seated on internal shoulder portion 83 of the piston 74 and inwardly curved segments 84 forming the smaller end of the frustum in contact with an annular end 86 of a support 88 for the brake pack 26. When piston 74 is stroked for engagement of the brake 26 the cone wire spring 80 deflects to store energy for returning the piston to the off position when apply pressure is relieved from the bore of piston 74.

The one-piece wire springs 52, 68 and 80 provide a high spring force with small deflection and require only a small space to thereby reduce and optimize transmission size. Since only one spring is needed for each piston transmission assembly is facilitated and overall transmission weight is reduced.

The special piston return springs 52, 68 and 80 of this transmission are formed from annealed wire stock having a circular elliptical or other uniform cross section. The spring stock is cut to predetermined lengths and each length is hooped into a circle and the ends are butt welded together at 86. After circling the part is waved to provide equally spaced and radiating spring arms shown best in FIGS. 2 and 3. After being waved the wire spring is dished into the frusto-conical shape such as shown in FIG. 4. The spring is suitably heat treated so that it has good resilience and wear properties.

While the springs of this invention have been described in connection with multiplate brakes and clutches for returning a hydraulically operated piston to an off position, they may be readily employed as an amplifier-type spring and used in place of the plate type cone spring such as that described in the U.S. Pat. No. 3,237,739 to P. B. Pritchard entitled "Clutch with Slotted Spring Discs," issued Mar. 1, 1966. With the construction of the present invention there is maximum utilization of the spring material, with little or no scrap and without special slots and openings.

While a preferred embodiment of this invention has been shown and described in detail to illustrate the invention, various changes and modifications may be made without departing from the scope of the invention set forth in the following claims.

I claim:

1. In a transmission having an input and an output, a gear unit operatively connecting said input to said output, a selectively engageable friction device operatively connected to said gear unit for selectively changing the input/output speed ratio of said transmission, motor means movably mounted in said transmission for effecting the engagement of said friction device, spring means operatively disposed between said motor means and said friction device, said spring means comprising a symmetrical one-piece wire spring of uniform cross section which is waved to have inwardly curved inner contact portions and to have outwardly curved peripheral contact portions and shaped into a serpentined wire frustum so that said inner contact portions form one end of said frustum and said outer contact portion forms a base of said frustum.

2. In a transmission having an input and an output, a gear unit operatively connecting said input to said output, a selectively engageable friction device operatively connected to said gear unit for changing the input/output speed ratio of said transmission, piston means mounted for movement in said transmission for effecting the engagement of said friction device, spring means operatively disposed between said motor means and said friction device for moving said motor means in one direction, said spring means comprising a symmetrical and continuous one-piece wire spring of uniform cross section which is circled and waved to have a plurality of radially extending spring arms with alternating inner and outer curved contact portions, and said spring means being shaped into a serpentined wire frustum with said inner contact portions forming one end of said frustum and said outer contact portions forming a base offset from said one end and means operatively securing said spring means within said transmission.

3. In a transmission having an input and an output, a gear unit operatively connecting said input to said output, a selectively engageable friction device operatively connected to said gear unit for changing the input/output speed ratio of said transmission, piston means mounted for movement from a retracted position to an apply position within said transmission for directly contacting and engaging said friction device, spring means for moving said motor means to said retracted position, said spring means comprising a symmetrical and continuous one-piece wire spring of uniform cross section which is circled and waved to have a plurality of radially extending spring arms with alternating inner and outer curved contact portions, and said spring means being frusto-conical in shape with said inner contact portions forming one end of said spring means and said outer contact portions forming a base offset from said one end, and means operatively mounting said spring means in said transmission in direct alignment with said piston means and said friction device.

* * * * *